July 5, 1960     M. G. SATEREN     2,943,588
CONTROL SYSTEM FOR TORPEDO
Filed April 22, 1946
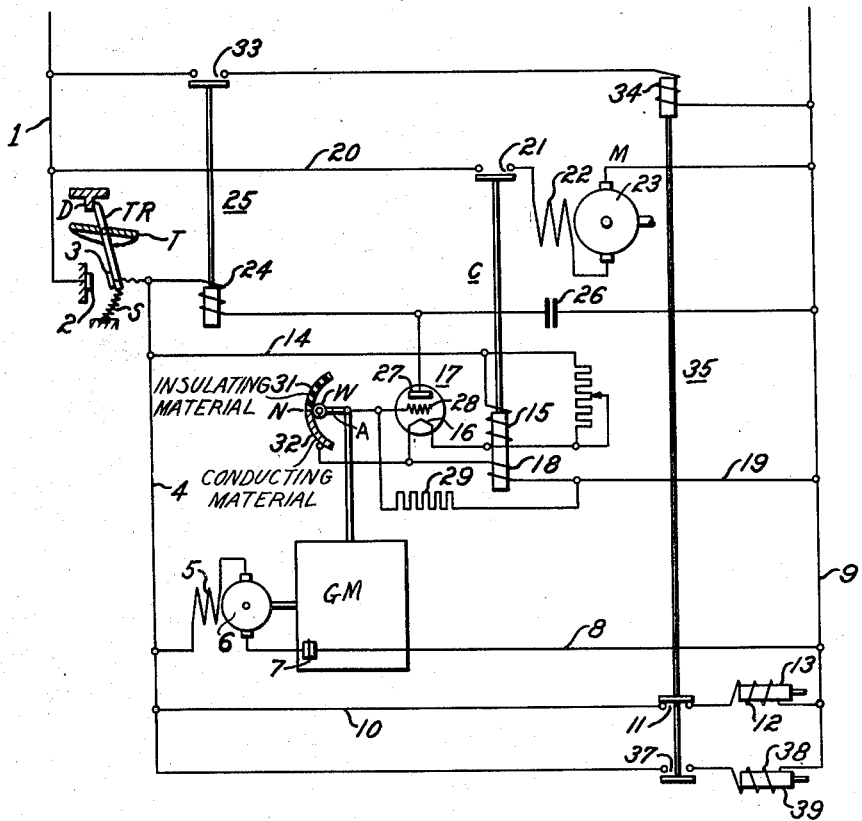
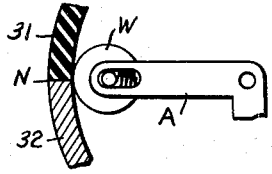
WITNESSES:
INVENTOR
Martin G. Sateren
BY
ATTORNEY : 2,943,588
Patented July 5, 1960

2,943,588
CONTROL SYSTEM FOR TORPEDO

Martin G. Sateren, Sharon, Pa., assignor, by mesne assignments, to the United States of America as represented by the Secretary of the Navy Filed Apr. 22, 1946, Ser. No. 663,807

3 Claims. (Cl. 114—23)

My invention relates to a system of control, and more particularly to a system of control for the steering rudders of a torpedo.

With the systems of control heretofore in use with torpedoes, the vibration of the torpedo harmfully affects the energization of the electromagnetic means for actuating the steering rudders.

A broad object of my invention is to make the steering control of a torpedo substantially independent of the vibration of the torpedo.

A still broader object of my invention is to effect reliable and unfailing operation of an electromagnetic device controlled by relays even though the relays are subject to intermittent energization.

Another object of my invention is to prevent the opening and closing of electric contacts in a control system subject to vibration which normally would cause the opening of a circuit that is to be maintained closed.

The objects recited are merely illustrative. Other objects and advantages will become more apparent from a study of the following specification and the accompanying drawing, in which:

Fig. 1 is a diagrammatic showing of a system of control, including my invention, for the steering rudders of a torpedo, and Fig. 2 is a detail view of the pick-up wheel and arm herein referred to.

In Fig. 1, the buses 1 and 9 represent the battery terminals of the propulsion battery of the torpedo. This battery is usually a one hundred and twenty volt battery. When particular voltage drops are mentioned hereinafter, the statements will be on the assumption that the supply is a one hundred and twenty volt supply.

In the showing of Fig. 1, the aft end of the torpedo is considered at the right with the armatures 13 and 39 constituting the actuating means for the steering rudders (not shown). The solenoids 12 and 38 constitute the electromagnetic means for actuating the armatures 13 and 39, respectively.

The contactor 35, having the break-contact 11 for coil 12 and the make-contact 37 for coil 38, controls the steering rudders. This contactor 35 is in turn controlled by the relay 25. It is an important feature of my invention to maintain relay 25 either energized or deenergized, depending on what action is required, regardless of any circuit interruptions of short duration that may occur at the gyro current pick-up wheel W and the segments 31 and 32.

As is well known in the art, the wheel W is, just before firing of the torpedo, set to course and when so set may either contact the segment 31 of insulating material or the segment 32 of conducting material. The position shown for wheel W in the figure is the position it holds when the torpedo is on course or the position it might hold if the war shot is not an angle shot.

The gyro is actuated by a gyro motor GM of the impulse type designed to bring the gyro up to full speed while the torpedo moves from a position of rest in the firing tube to full speed at the end of the firing tube. The gyro, when up to full speed while yet in the tube, opens the circuit for the gyro motor GM at contacts 7 and unlatches itself so that it assumes its controlling action. For a more detailed discussion of the gyro motor and the unlatching means, reference may be had to the copending application of Henry V. Putman, Merril G. Leonard, Louis N. Grafinger and John A. Guidosh, filed November 8, 1945, Serial No. 627,499, and entitled Control Device, now Patent No. 2,543,422 issued February 27, 1951.

Where a hard-over, or On-Off gyro steering control is used in a torpedo, it is very desirable to keep the contact wheel W of the gyro switching mechanism as small and as light as possible to hold friction down to an absolute minimum. However, when the wheel is thus made as light as possible and the resilient spring loaded mounting arm A as light as possible, vibration, which is rather prevalent on a torpedo, then causes the wheel W to chatter. This may, and at times does, cause rather erratic operation of the overall control. At times the chattering may cause the circuit at the wheel W to remain open for a sufficiently long time to prevent relay operation entirely. My system of control, among other novel and useful functions, prevents such erratic operation.

A better understanding of the novel features of my invention can be obtained from a study of the operation of the apparatus shown in Fig. 1.

When the torpedo is fired from the firing tube, a dog D on the firing tube actuates the trigger switching means TR at the instant the torpedo begins to move. Operation of the trigger switching means establishes a circuit from the positive terminal 1 of the propulsion battery (not shown) through contacts 2 and 3, conductor 4, field 5 and armature 6 of the gyro motor GM, contacts 7 and conductor 8 to the negative terminal wire 9 of the battery.

The gyro motor, being of the impulse type accelerates the gyro up to full speed of about 12,000 to 15,000 r.p.m. while the torpedo moves the length of the firing tube. Just before the torpedo leaves the firing tube, the contacts 7 open and the gyro uncouples itself from the motor GM and also unlatches its frame from its fixed relation to the torpedo. The gyro thus assumes its control function.

The energization of conductor 4 also establishes a circuit from this conductor through conductor 10, contacts 11, solenoid 12 to the negative terminal 9. This circuit may be of very temporary duration depending on the type of angle shot that is being made. Let the assumption be that the target is to port by a given angle and that the wheel W is thus set to starboard a corresponding angle, that is, is disposed a given clockwise angle with reference to the neutral N and is thus in contact with the segment 31 of insulating material.

The energization of conductor 4 also establishes a circuit from this conductor through conductor 14, actuating coil 15 of the contactor C for the propulsion motor M, the filament 16 of the tube 17, the second actuating coil 18 of the contactor C, and conductor 19 to the negative battery terminal wire 9.

The contactor C is provided with these two coils 15 and 18 so that there will be about 100-volt drop across coil 15 and about a 20-volt drop across coil 18. The filament is thus called upon to carry the total current passing through these two coils and thus heats up rather rapidly so that the control may take effect as soon as the torpedo is underway on its own power. The 20-volt drop across the coil 18 provides a cut-off bias for the tube 17.

Operation of contactor C closes the contacts 21 to establish the circuit for the propulsion motor M by the circuit from conductor 1 through conductor 20, contacts 21, field 22 and armature 23 of the propulsion motor M to the negative battery terminal wire 9. The propulsion equipment thus takes hold as soon as the torpedo is in the sea.

Since the grid 28 is electrically connected to the wheel W which happens to be on the segment 31 of insulating material and is also connected to the negative terminal wire 9 through the resistor 29 of relatively high resistance value, the grid will be substantially at the potential of the negative terminal 9. The tube will thus be non-conducting. The relay 25, which has its coil 24 in the circuit of the anode, or plate 27 of the tube 17, will not be energized. Coil 34 will thus not be energized and contacts 11 remain closed. The armature 13 will thus move the steering rudders so as to cause the torpedo to swing until the wheel W passes the neutral N and makes contact with the segment 32 of conducting material.

When the wheel makes contact with segment 32, the grid 28 becomes more positive than it was before and the tube 17 thus becomes conducting. A circuit is thus established from conductor 4 through actuating coil 24 of relay 25, plate 27, filament 16, coil 18, and conductor 19 to the negative battery terminal wire 9.

Operation of relay 25 closes contacts 33, thus energizing coil 34. Operation of relay 35 closes contacts 37 to energize coil 38. The armature 39 now actuates the steering rudders in such direction that the torpedo swings in such manner that the wheel W moves along segment 32 in the direction of the neutral N. The cycle thus tends to repeat itself but since the vibrations on the torpedo cause circuit interruption at the wheel W, the plate current might vary accordingly but to prevent a corresponding current variation in coil 24, I connect the capacitor 26 directly across the plate circuit. During the intervals the plate carries a current, the condenser, or capacitor, 26 is discharged through the tube but during the brief interval the tube is non-conducting the charging current for the capacitor 26 keeps the coil 24 energized. The condenser 26 is chosen large enough to give smooth control relay operation even though there be chattering contact operation at the wheel W. The gaps between contact times in the chattering gyro switch are effectively bridged and the control relay 25 will operate smoothly.

In operation, with the circuit at wheel W open the tube 17 is based almost to plate current cut-off by the 20-volt drop across coil 18. The control relay is then not operated and the condenser 26 is charged to full battery voltage. When the wheel W closes its circuit, it connects the grid 28 directly to the filament thus eliminating the bias and permitting full plate current to flow. This discharges the condenser and operates the control relay.

The basic advantages of my contribution are at least three. First, the current to be carried by the wheel is reduced from .015 ampere, the current value usually required of a relay such as 25, to .0002 ampere. This eliminates any burning and pitting of the current carrying surfaces. Second, with proper components there should at no time be any chattering of the control relay 25 with the normal chattering of the gyro switch wheel W due to the normal vibration on a torpedo. Third, the control relay operation should be positive and exact with no backlash of variation due to gyro switch chattering.

While I have shown and described but one embodiment of my invention, I do not wish to be limited to the one embodiment disclosed but wish to be limited only by the scope of the claims hereto appended.

I claim as my invention:

1. In a system of control for the steering system of a torpedo, in combination, a pair of supply terminals, a circuit including an electromagnetic device and an electronic device, said electronic device including a plate and a cathode, connected in series with said electromagnetic device, and including a control grid, a steering control gyro for the torpedo having a light contact wheel, a pivoted arm carrying the wheel, resilient mounting means for the wheel in said arm, movable arcuate torpedo course-setting segments disposed about the pivot of the arm to contact said wheel, said wheel and mounting being subject to the vibration of the torpedo to thus normally make chattering contact with said segments, said grid being electrically connected to said wheel and thus being subject to intermittent biasing operation so that said electronic device is intermittently conducting, a capacitor connected in parallel to the plate and filament, said capacitor being so chosen in capacity that the electromagnetic device remains energized during the intervals the electronic device is non-conducting.

2. In a system of control for a torpedo, in combination, a pair of supply terminals, an electronic device including an anode, a control grid, and a cathode, a heating circuit for the cathode including an impedance of a given impedance value, the cathode, and a second impedance of much lower impedance value, a circuit to be controlled including an electromagnetic device, the anode, the cathode, and the impedance of lower value, a capacitor connected in parallel to said anode, cathode and impedance of lower impedance value to the negative terminal of said terminals, a steering control gyro, course setting means comprising two arcuate segments one of insulating material and one of conducting material and being mounted for movement in the direction of their arcs, a relatively small light wheel, mounted on a light flexible arm coupled to the gyro, disposed to make contact with the course setting means which course setting means are disposed arcuately about the pivot point of said arm, a resistor of relatively high resistance value, said grid being connected to said wheel and the conducting segment of the course setting means and being connected to the negative terminal of said supply through said impedance of lower impedance value, whereby the bias of said grid is controlled by said wheel, said grid being also connected to the negative terminal of said supply through said resistor of high resistance value, said wheel being light and resiliently mounted thus makes chattering contact with the course setting means and thus causes intermittent operation of said electronic means, said capacitor being selected to have a capacity sufficient to keep said electromagnetic device energized during the intervals the electronic device is non-conducting.

3. In a system of control for a torpedo, in combination, a pair of supply terminals, an electronic device including an anode, a control grid, and a cathode, a heating circuit for the cathode including an impedance of a given impedance value, the cathode, and a second impedance of much lower impedance value, a circuit to be controlled including an electromagnetic device, the anode, the cathode, and the impedance of lower value, a capacitor connected in parallel to said anode, cathode and impedance of lower impedance value to the negative terminal of said terminals, a steering control gyro, course setting means comprising two arcuate segments one of insulating material and one of conducting material and being mounted for movement in the direction of their arc, a relatively small light wheel, mounted on a light flexible arm coupled to the gyro, disposed to make contact with the course setting means which course setting means are disposed arcuately about the pivot point of said arm, a resistor of relatively high resistance value, said grid being connected to said wheel and the course setting means being connected to the negative terminal of said supply through said impedance of lower impedance value, whereby the bias of said grid is controlled by said wheel, said grid being also connected to the negative terminal of said supply through said resistor of high resistance value, said wheel being light and resiliently mounted thus makes chattering contact with the course setting means and thus causes intermittent operation of said electronic means, said capacitor being selected to have a capacity sufficient to keep said electromagnetic device energized during the intervals the electronic device is non-conducting, and means responsive to said electromagnetic device for controlling the steering rudders of a torpedo.

References Cited in the file of this patent

UNITED STATES PATENTS

| | | |
|---|---|---|
| 1,555,893 | Thompson | Oct. 6, 1925 |
| 2,265,203 | Six | Dec. 9, 1941 |
| 2,417,766 | Leonard | Mar. 18, 1947 |
| 2,434,948 | Miller | Jan. 27, 1948 |

FOREIGN PATENTS

| | | |
|---|---|---|
| 261,384 | Great Britain | Oct. 6, 1927 |
| 884,807 | France | May 8, 1943 |